Nov. 20, 1934.  L. DE FLOREZ  1,981,346
FRACTIONATING TOWER
Filed Jan. 14, 1931  2 Sheets-Sheet 1
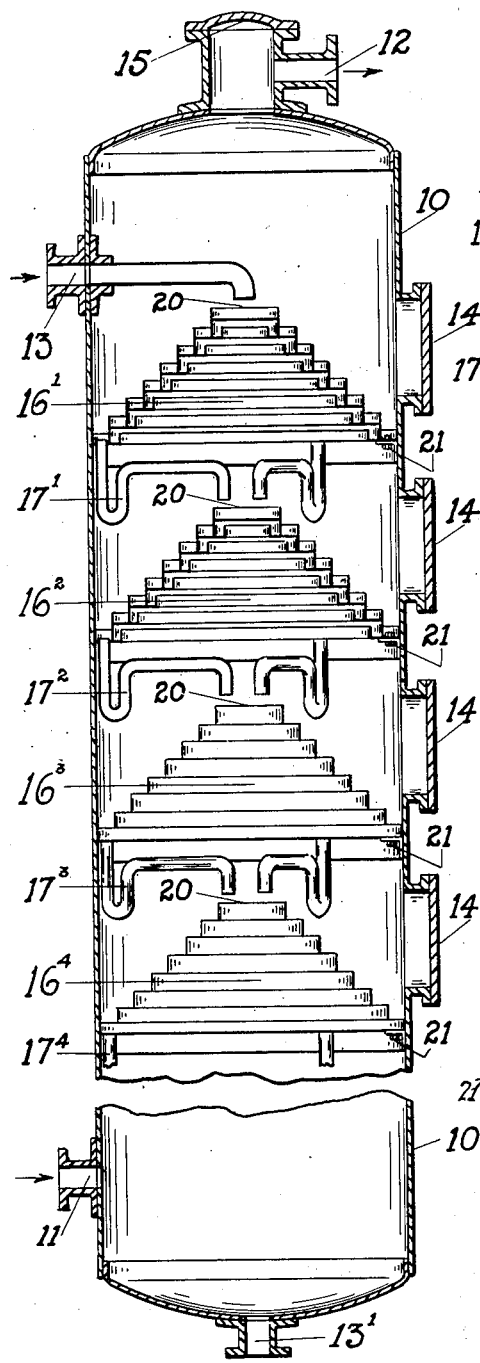
Fig. 1
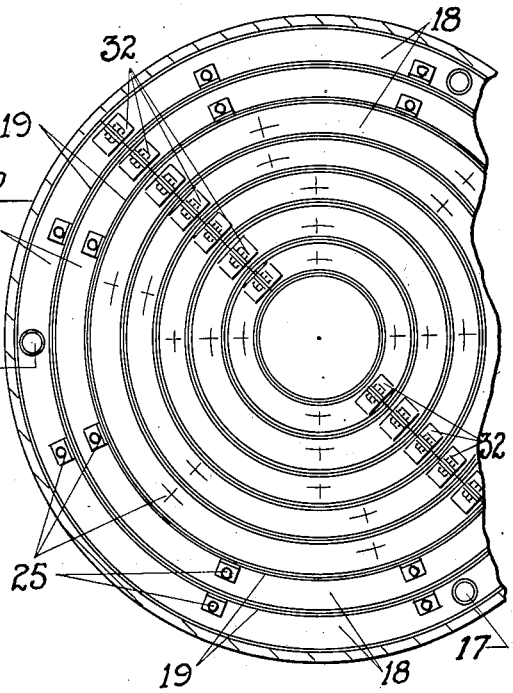
Fig. 3
Fig. 2
Luis Deflorez  Inventor
By his Attorneys Nov. 20, 1934.  L. DE FLOREZ  1,981,346
FRACTIONATING TOWER
Filed Jan. 14, 1931   2 Sheets-Sheet 2
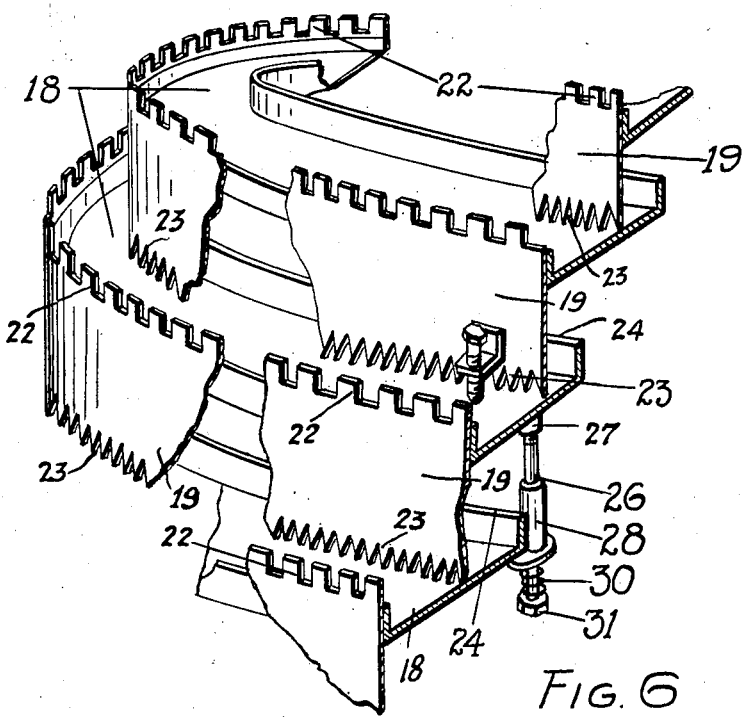
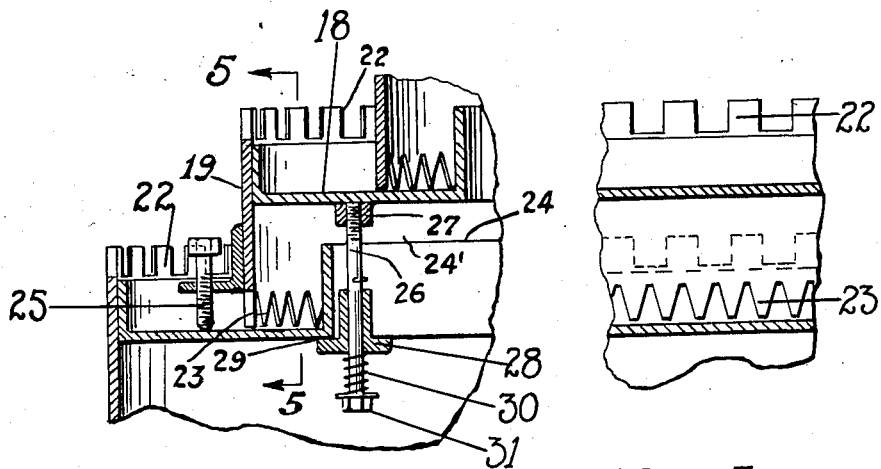
Luis Deflorez Inventor
By his Attorneys Patented Nov. 20, 1934

1,981,346

UNITED STATES PATENT OFFICE 1,981,346

FRACTIONATING TOWER

Luis de Florez, Pomfret, Conn.

Application January 14, 1931, Serial No. 508,793

2 Claims. (Cl. 261—114)

This invention relates to a counter current contacting device and more particularly to a liquid vapor contacting or fractionating device of a type suitable for use in oil processing.

The fractionating equipment now generally in use in commercial processes consists of the bubble or bell cap type. In such an apparatus the fractionating tower is divided into compartments by rigid horizontal plates or sections. These plates have a plurality of orifices in them over which are placed bell caps to direct vapors passing up through the orifices down into the liquid on the plate and to distribute the vapor in the liquid in order to obtain effective contacting between the vapor and liquid. The liquid flows down the tower from each of the plate sections by means of downflows. These downflows are closed by a liquid seal of course, in order to prevent vapors from passing upwardly through them.

To obtain the best liquid vapor contacting conditions, it is desirable that the vapor pass through the liquid in small streams or bubbles. However, the orifices in the plate must be of sufficient size and number to permit the vapors to freely pass upwardly through the tower without a great pressure being formed in overcoming the resistance to flow. It is seen, therefore, that the number of orifices in the plate and therefore the number of bell caps per plate ranges between a few orifices of large diameter which would permit a free flow with poor contacting conditions and a great number of small orifices which would give good contacting conditions, but with restricted flow and a high back pressure. The diameter of the fractionating tower is, of course, limited by several factors. For these reasons, therefore, although the bubble type towers now generally in use are efficient as counter current contacting means, they have certain inherent disadvantages.

Among these disadvantages is the back pressure which is generated within the tower due to the lack of free area as described above. This back pressure is a disadvantage from a processing standpoint in that it results in a considerable difference in pressure between the inlet and outlet of the tower and in many cases such a difference in pressure indicates an undesirable condition. This is particularly true in vacuum distillation. The back pressure in the lower parts of the tower may become such that the vapors are forced up through the downflow pipes and the downward flow of liquid through the tower stopped or at least materially decreased, so that the tower becomes practically inoperative as a contacting medium. To overcome this difficulty it has been necessary in the conventional bell cap type of tower to space the plates relatively far apart in order to give sufficient head to the liquid in the downflow pipes or use pipes of larger diameter for a given capacity and corresponding downflow area. Such a procedure necessitates towers of relatively large volume in order to obtain the required capacity.

Another disadvantage of the usual type of fractionating tower has been their inability to take care of sudden increases in the volume of vapors such as when in oil processing a "slug" of water gets into the system. Their rigid plate sections with the fixed free area of the orifices in the plate sections are unable to compensate for the immense rush of vapors which together with the inherent structural weakness of the flat tray construction often results in injury to the sections leading to shut downs to make the necessary repairs. Some attempts have been made to overcome this disadvantage by making the bell caps movable, but the limited additional area they uncover when unseated and the difficulty of providing for reseating, make these provisions of little actual value.

A further disadvantage of the bubble cap type of tower and many other towers known in the prior art is the difficulty of cleaning them. It is well known, for example, in the oil industry that a gummy deposit will be formed on the plate sections due to the action of sulphur, polymerization or coking. Due to the many bubble caps with their relatively small orifices which are attached to the plate section by various clamps and bolts, the cleaning of these plates takes considerable time and labor.

In my structure I have increased the area of the fractionating section for a given diameter of tower and thus have increased the available area in which orifices may be made to constitute the free area. By utilizing a fractionating section which is divided into parts positioned in a plurality of different planes as distinguished from a tray entirely in a single horizontal plane as formerly used the free area has been greatly increased. Also, I have obtained a method for taking care of excessive vapor velocities and pressure by varying the amount of free area, dependent upon the requirements. By utilizing sections of inherent structural strength, I have added to the strength of the tray. These sections also permit the use of pressed metal, non-corrosive alloys, suitably formed to minimize the weight for a given capacity. In my structure I also increase the contacting between vapor and liquid by combining a spray or cascade effect with a bubble action.

One of the primary objects of my invention is to overcome the several disadvantages outlined above.

A further object of my invention is to obtain a counter current contacting apparatus in which the resistance to flow of vapors or back pressure approaches the minimum.

Another object of my invention is to obtain the maximum contacting between the liquid and vapors.

Another object of my invention is to obtain a fractionating apparatus in which the free area of the fractionating sections approaches the maximum.

A further object of my invention is to obtain a fractionating apparatus which is of simple construction and which may be easily cleaned.

Other objects and advantages of my invention will appear from the following drawings in which:

Figure 1 represents a sectional elevation partly broken of a fractionating tower, Figure 2 represents an enlarged broken section of one of the fractionating sections of Figure 1, Figure 3 represents a plan section of Figure 2, Figure 4 represents a cross section of a portion of the contacting device, Figure 5 represents a section taken at 5—5 of Figure 4, and Figure 6 represents a prospective view partly broken of one of the contacting devices.

Referring more particularly to the drawings in which like reference characters denote like parts, reference character 10 designates the shell of the usual type for a fractionating tower. This shell is fitted with the vapor inlet 11, the vapor outlet 12, liquid inlet 13, liquid outlet 13' and man holes 14 on the side at the various fractionating sections. There may also be a man hole 15 at the top. Within the shell there are the fractionating sections or contacting elements $16^1$, $16^2$, $16^3$, and $16^4$. These contacting elements will be described more in detail later. From the low points of each of these contacting elements there are attached the downflows $17^1$, $17^2$, $17^3$, and $17^4$ respectively. Each downflow has a well so that a liquid seal is maintained, preventing the upward passage of vapors.

The contacting elements preferably are made up of circular channels or like sections 18 which are placed one above the other in stepped arrangement. Each of these channels or troughs has on its outer side a baffle 19 which extends down into the tray next below. The top most section of the contacting device consists of a circular tray 20 rather than a ring. This circular tray is also fitted with a baffle 19 extending into the next lower ring channel. The lowermost ring channel may rest upon a flange 21 fitted around the side of the fractionating tower and a seal formed between the channel and the flange so that vapors will not pass upwardly between the fractionating section and shell. The upper outer edge of each of the ring channels is preferably notched as shown at 22 so that a series of weirs are formed. The lowermost portion of each of the baffles 19 are notched or serrated as shown at 23. The inner edge of each of the ring channels is somewhat higher than the notched outer edge so that liquid will run over the edge 22 rather than the inner edge 24. It will also be noted that there is an open space 24' left between the upper inner edge 24 and the bottom of the next above channel. The superposed ring channels and side baffles may be supported by the lower edge 23 of the baffles 19 resting upon the bottom of the next lower channel. However, it may be desirable to support the rings by means of the threaded bolts 25 attached to the baffles 19. These bolts may be used to adjust each of the ring channels to a level position.

The group of channels forming a fractionating section may be held together by means of the bolts 26 which are screwed into sockets 27 on the lower part of the bottom of the next above channel. This bolt may carry the collar 28 which has a flange which will hook under the bottom of the lower channel as shown at 29, Figure 4, thus holding the channels together. I have shown a preferred arrangement in which a spring 30 is interposed between the collar 28 and the bolt head 31. By this means the next above channel may lift away a certain distance from the next lower channel by overcoming the gravitational force and also the resistance of the spring 30.

The ring channels may be made in half circle sections and bolted together as shown at 32, Figure 3. These sections may be then easily removed from the tower through the man holes 14 by merely unbolting. Other shapes of channels may be made in such sections that they will pass through the man holes.

The liquid entering through the line 13 is directed on to the upper most fractionating section $16^1$ and falls upon the uppermost part of this section at 20. The liquid overflows from the tray 20 through the weirs 22 and drops on to the ring channel next below. When the tower is in operating condition each of the ring channels are filled and overflow to that one next below through the weirs 22. Upon reaching the lowermost channel the liquid flows through the downflow pipes 17 and is again directed to a similar group of ring channels forming the next fractionating section. The vapors enter through the inlet 11 and flow upwardly through the tower. Upon reaching the first fractionating section they pass through the openings $24^1$ just above the upper inner edge of each of the ring channels. They are then directed downwardly by each of the baffles 19 and forced through the liquid in the channels. The position of the channels with respect to each other, each group resting within the next larger annular member, forms orifices for the gases between adjacent channels. The serrated edges 23 of the baffles, of course, facilitate the distribution of the vapors and increases the efficacy of the contact by helping the bubbling action. The vapors then pass upwardly through the liquid on the outside of the baffle plates 19 and enter the portion of the tower above the fractionating section. Here, however, they are immediately subjected to a further contacting with the liquid due to the cascade effect of the liquid flowing downwardly over the weirs 22 to the lower trays. In this way the vapors are caused not only to bubble through the liquid, but are sprayed with liquid as a second contacting action. They then pass upwardly through the next fractionating section where the action is repeated. The fractionating tower will contain, of course, the desired number of fractionating sections to accomplish the proper separation or absorption. The vapors pass from the tower through the outlet 12. The liquid passing downwardly through the tower may be removed through the outlet 13'.

By placing the fractionating sections at an angle rather than in the usual horizontal position, the area available through which vapors may be permitted to pass is considerably increased. That is, the available area in which orifices may be made is increased and thus the free area may be increased. I have illustrated in the accompanying drawings an arrangement in which the fractionating section is conical in shape and in this way have considerably increased the area available through which the vapors may pass. It is, of course, possible to arrange the fractionating section in other positions, for example, with a square fractionating tower or one having flat sides, superposed channels, of straight sections corresponding to the ring channels here shown, arranged in a stepped fashion across the tower or pyramidically could be used. Thus by utilizing a plurality of planes for the fractionating section many advantages are to be had. I have, furthermore, utilized this increased available area through which the vapors may pass in the most efficient manner by having a large opening between each of the plurality of channels used in each fractionating section and by carrying these vapor openings 24' completely around the channels. It is seen, therefore, that I have increased the free area considerably and approach the condition in which the only back pressure is that caused by the bubbling of the vapors through the small head of liquid in each channel. The many advantages brought about by obtaining such a low back pressure are apparent.

As already pointed out, the bell cap plates of a conventional bubble tower cannot be put too closely together due to possible entrainment of liquid by the vapors passing upwardly through the tower and due to the necessity for a relatively long downflow of pipe to insure the downward passage of liquid against the back pressure formed in the tower. I have found that the most effective arrangement of fractionating sections is one in which the angle of incline formed by the channels is approximately 45 degrees. This permits me to place my fractionating sections substantially as close together as the fractionating sections in the ordinary bell cap type of tower. They may, of course, be arranged with a smaller angle of incline, in which case, they may be put closer together.

It is possible, of course, to place my type of fractionating section so that it is somewhat dished and thus obtain a greater number of fractionating sections within a fractionating tower of the same height than would ordinarily be possible. This would necessitate, of course, the use of pumps, steam lifts, or other means for lifting the liquid from the upper fractionating section so that it could be discharged upon the upper tray 20 of the next lower fractionating section when the trays are so dished that the upper part of the lower section is higher than the lower part of the upper section. In this manner a steep angle of incline with the resulting increase in available area may be used and yet a large number of fractionating sections placed within the tower of normal height.

The channels may be adjusted by means of the adjusting bolts 25 so that each of them is level permitting the liquid to flow over the edge at all points. However, the weirs 22 will compensate for a certain amount of slope in the trays and still give an overflow at all points. Although a large portion of the liquid may be overflowing through the weirs on one side, at least a small portion may be overflowing through the weirs on the opposite side sufficient to contact with the upwardly passing vapors and to keep the next lower channel filled at that same point.

As pointed out above, very often a sudden increase in the volume of vapors will cause such a pressure upon the rigid plate in the ordinary bell cap type of tower that it will be broken or fractured and a fractionating section or the whole fractionating tower put out of commission. With my type of fractionating section, it is possible to eliminate this undesirable possibility. In the first place, the free area of my fractionating section is so great that it will take care of a large increase in the volume of vapors without any special apparatus or arrangement. However, in order to compensate for those increases which approach explosive violence, I have provided means for varying the free area. The connecting bolts between the trays are fitted with a flexible spring arrangement 30 so that the rush of vapors may lift each of the trays a regulated distance, permitting the vapors to pass between the trays and under the baffles 19 without passing through the liquid. After the rush of vapors is passed, the trays reseat themselves. These extending fasteners may be placed between each of the superposed trays so that an accordion effect is permitted, or if desired, they may only be placed between one pair of trays. The spring on these extending bolts causes a quick return to normal position and furthermore, tends to keep the trays from lifting, except under extreme increases in vapor velocities. In this connection it should be appreciated that even when the channels are lifted under extreme rushes of vapor so that the bubbling effect is eliminated, the vapors still receive a scrubbing with liquid from the cascade effect. Thus even under extreme operating conditions effective fractionation is carried on.

The individual ring channel sections may be made out of relatively light material inasmuch as it is unnecessary for them to withstand the great pressures to which the rigid tray in the usual bell cap towers may be subjected. Furthermore, channels of the type shown are bent shapes and thus have certain inherent structural strength. It is possible, therefore, to press them out of steel sheets or other pressed stock or if desired, certain of the chromium alloys may be utilized. The baffle sections 19 may be welded to the channels and may be made out of light material. It is possible, of course, to form the baffle and channels from a single sheet or cast sections may be made. It is desirable to make them in half circle sections which may be bolted together. This will permit easy removal from the tower for cleaning. In this connection, it is apparent how easily the fractionating sections may be cleaned inasmuch as they may be easily lifted apart and there are no complicated parts which cannot be quickly reached.

My fractionating section is not complicated by the use of intricate parts. Any number of fractionating sections may be used, dependent upon the height of the fractionating tower and the number of fractionating sections desired. The trays may merely be piled one upon the other and only that number used in each fractionating section which is most desirable. This permits a standardization of parts in that the channel sections can be made up with various standard dimensions and the various fractionating sections built up from these standardized sectional channels.

It should be appreciated that there are many possible variations and modifications of my type of fractionating section which will now become apparent to those skilled in the art. As already pointed out, it is possible to obtain my increase in the available area for the passage of vapor by the use of straight sections or various other forms and by superposing them in a variety of manners. I, therefore, do not wish to be limited by the specification and drawings, but only by the appended claims.

What I claim is:—

1. A countercurrent contacting apparatus comprising a plurality of groups of conically arranged annular receiving members having progressively increasing diameters, each of said individual annular members adapted to spill liquid progressively outwardly, the lower edges of the inner annular members of each group resting within the next larger annular member forming an orifice for gases, the lower member of each group being adapted to discharge to the upper member of the next corresponding group, and reseating means for limiting vertical movement between the individual annular receiving members, whereby the orifice area may be increased under abnormal conditions.

2. A countercurrent contacting apparatus comprising a plurality of conically arranged annular liquid receiving members having progressively increasing diameters, each of said annular members consisting of an annular trough having sectional abutting portions, a skirt attached to the outer circumference of each of said sections of said trough and extending below said trough having serrated upper and lower edges, the lower edge of the skirt on the inner annular members of each group resting within the trough of the next larger annular member to form an orifice for gases whereby the outermost annular member supports the other annular members of said group, the lower member of each group being adapted to discharge to the upper member of the next corresponding group, and reseating means for limiting vertical movement between the several annular receiving members of each group whereby the orifice may be increased under abnormal conditions.

LUIS DE FLOREZ.